R. L. AMBROSE.
VALVE MOTION FOR PNEUMATIC TOOLS.
APPLICATION FILED MAY 22, 1912.
1,131,812.
Patented Mar. 16, 1915.
3 SHEETS—SHEET 1.
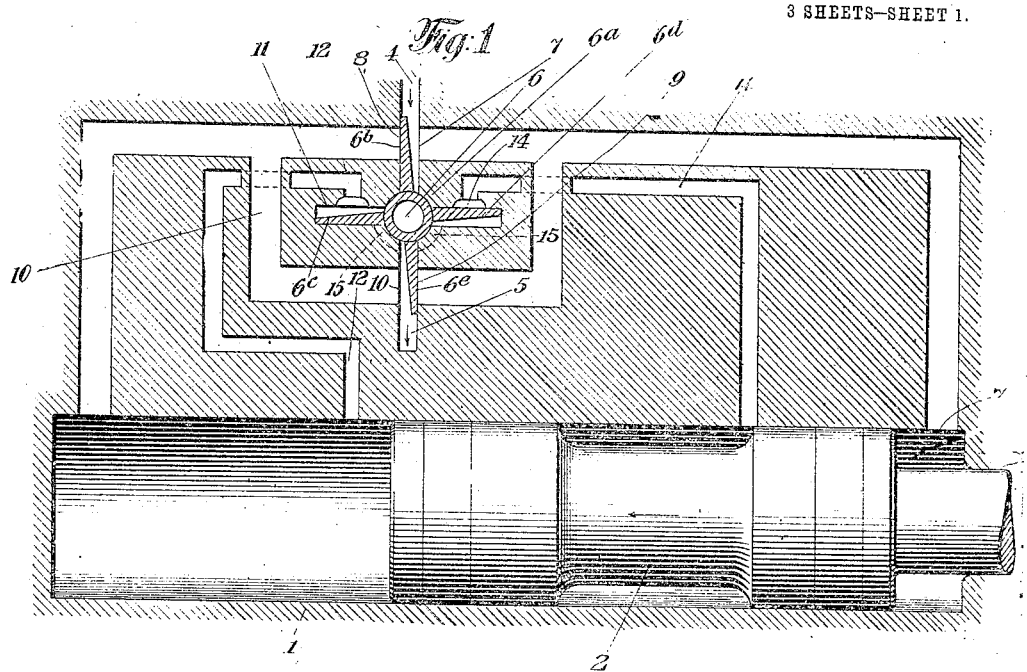
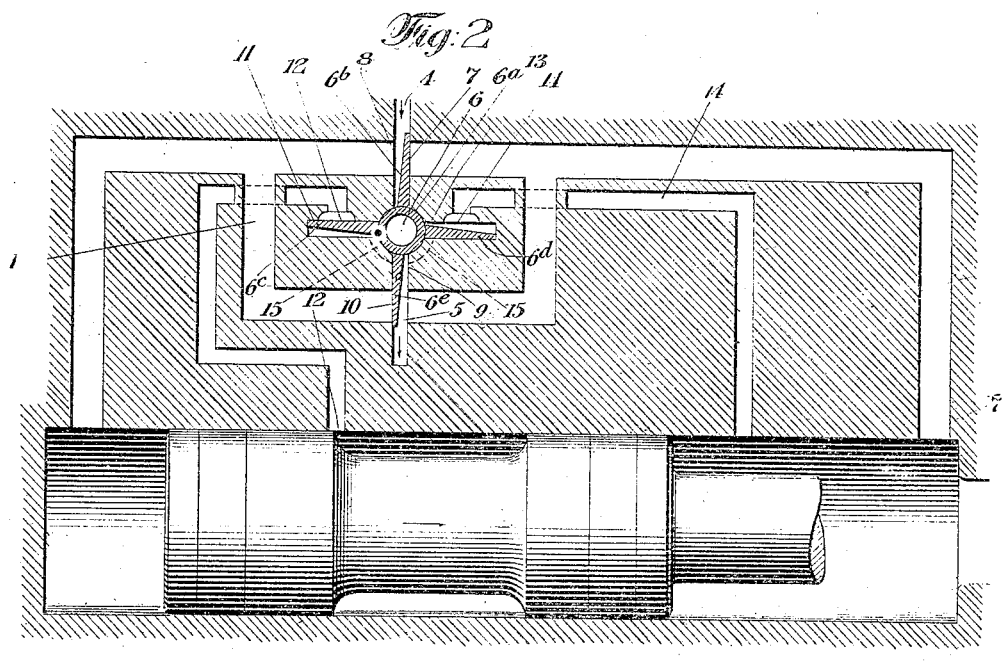

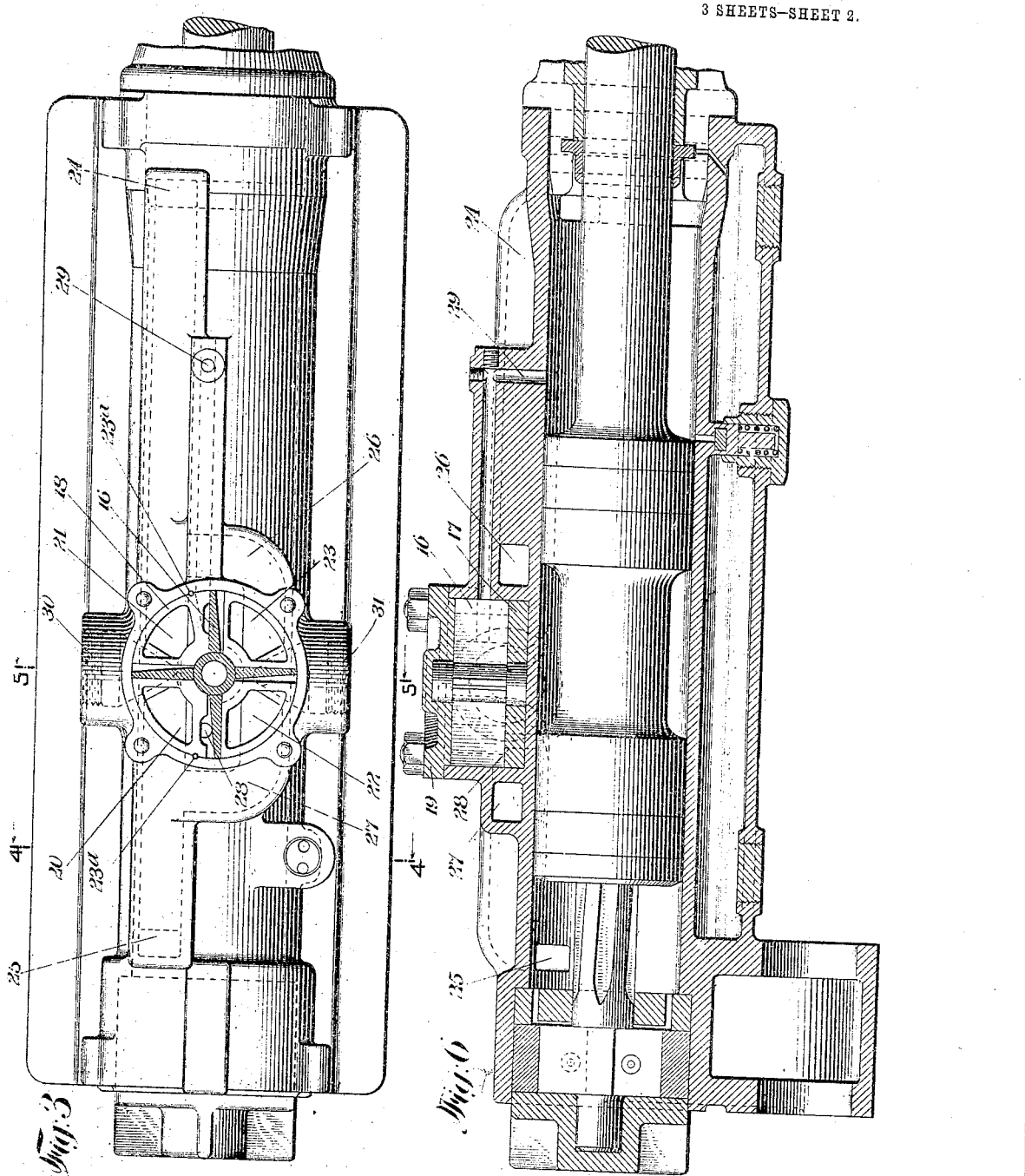

R. L. AMBROSE.
VALVE MOTION FOR PNEUMATIC TOOLS.
APPLICATION FILED MAY 22, 1912.
1,131,812.
Patented Mar. 16, 1915.
3 SHEETS—SHEET 3.
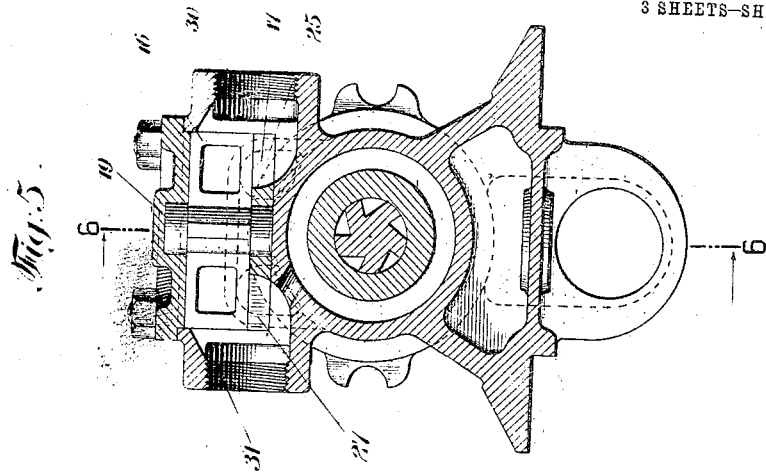
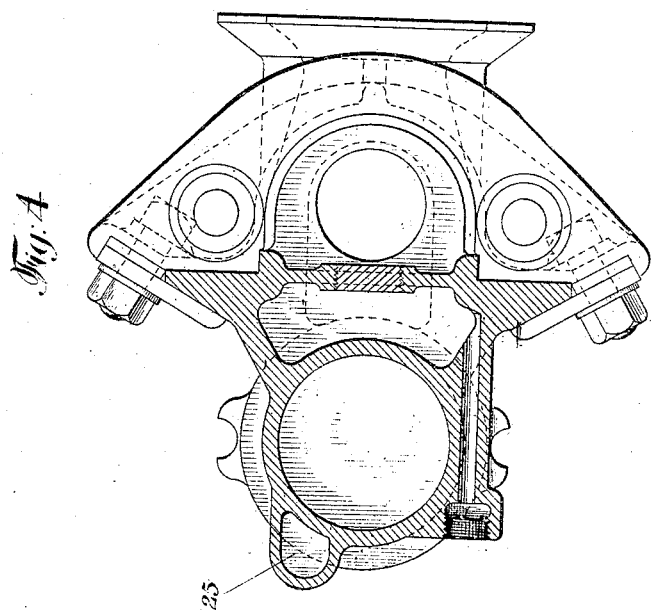

UNITED STATES PATENT OFFICE.

ROBERT LUNNAN AMBROSE, OF EASTON, PENNSYLVANIA, ASSIGNOR TO INGERSOLL-RAND COMPANY, OF NEW YORK, N. Y., A CORPORATION OF NEW JERSEY.

VALVE-MOTION FOR PNEUMATIC TOOLS.

1,131,812.   Specification of Letters Patent.   Patented Mar. 16, 1915.

Application filed May 22, 1912. Serial No. 698,909.

*To all whom it may concern:*

Be it known that I, ROBERT L. AMBROSE, of Easton, in the county of Northampton, and in the State of Pennsylvania, have invented a certain new and useful Improvement in Valve-Motions for Pneumatic Tools and do hereby declare that the following is a full, clear, and exact description thereof.

The object of my invention has been to provide a valve motion for pneumatic tools which shall have, among others, the advantages of permitting the tool to strike an uncushioned blow; of throwing the valve and holding it, after it is thrown, with certainty, and of permitting the use of a relatively simplified arrangement of ports, and to such ends my invention consists in the valve motion hereinafter specified.

In the accompanying drawings: Figures 1 and 2 are diagrammatic sectional views of a valve motion embodying my invention, showing the two positions of the valve; Fig. 3 is a plan view with the cover of the valve box removed and the valve in section of a commercial embodiment of my invention; Fig. 4 is a view on the line 4—4 of Fig. 3; Fig. 5 is a section of Fig. 3 on the line 5—5; and Fig. 6 is a section of Fig. 4 on the line 6—6.

My invention is capable of embodiment in many different forms. I have illustrated that embodiment which is the best one known to me, but the illustrated embodiment is to be regarded as typical only of many possible embodiments.

In the embodiment illustrated in Figs. 1 and 2, a cylinder 1 contains a piston 2. In the valve box 3 there is an inlet port 4, and an exhaust port 5. A valve 6 is provided, which preferably has a cylindrical body $6^a$, and four wings, respectively, $6^b$, $6^c$, $6^d$ and $6^e$. The cylindrical body $6^a$ is mounted in a cylindrical bore in the valve-box and serves as a trunnion on which the valve as a whole oscillates. The wing $6^b$ is located in the inlet port 4, such port being preferably in the form of a parallel-walled slot, and the wing being preferably tapered so that its opposite faces may fit against one or the other wall of said slot to close ports 7 and 8 therein. The port 7 extends to the forward end of the cylinder and preferably enters said cylinder at a point so far forward that no air can be trapped beyond it by the piston, thus permitting the piston to strike an uncushioned blow. The port 8 enters the rear end of the cylinder, but preferably at a point slightly forward of such rear end, so that air may be trapped therein to cushion the return stroke of the piston. A branch port 9 extends from the right wall of the exhaust slot 5 to a connection with the port 7, and an exhaust port 10 extends from the left wall of the said exhaust slot to a connection with the said slot 8. The admission and exhaust of air to and from the cylinder for the purpose of driving the piston is controlled entirely by the wings $6^b$ and $6^e$. It is for the purpose of throwing or shifting the valve at the proper times that the wings $6^c$ and $6^d$ are provided. The wing $6^c$ is mounted in a slot 11 having a port 12 opening through the upper wall and entering the cylinder at a point where it is uncovered by the rear end of the piston shortly before the piston reaches the forward limit of its travel. The wing $6^d$ is mounted in a slot 13 having a port 14 opening through its upper wall and entering the cylinder at a point where it is uncovered by the forward end of the piston, after the piston had gotten well started on its return stroke. The edges of the wings $6^c$ and $6^d$ fit the vertical walls of their slots so that they may act as pistons therein. Grooves 15 extend from the bottoms of the slots 11 and 13 to the exhaust slot 5, so that any live air which may leak from the upper to the lower sides of the wings $6^c$ and $6^d$ may escape and not produce back pressure.

In the operation of my valve motion, as shown in Figs. 1 and 2, the piston being assumed to be at the rear end of the cylinder, and the valve in the position shown in Fig. 2, the live air from the slot 4 passes through the port 8 to the rear end of the cylinder driving the piston forward, the air ahead of the piston being exhausted through the ports 7 and 9 into the exhaust slot 5. This condition continues until the piston passes beyond the port 12, when the live air rushes up such port, and bearing on the upper surface of the wing $6^c$ forces the latter down, shifting the valve to the position shown in Fig. 1 and holding it in such position. By the time the piston has uncovered the port 12, the piston is traveling at such high velocity that it delivers its blow before the live air is admitted to the forward end of the cylinder. The shifting of the valve to the position shown in Fig. 1 closes the port 8 by means of the valve wing 6$^b$ and exposes the live air port 7, the wing 6$^c$ at the same time closing the branch port 9 and opening the branch port 10 to the exhaust. Live air now reaches the forward end of the cylinder by the port 7 and starts the piston back, the air at the rear of the piston being exhausted through the ports 8 and 10. This action continues until the forward end of the piston uncovers the port 14, when live air rushes up such port, and bearing on the upper side of the wing 6$^d$ forces the latter down, thus shifting the valve to the position shown in Fig. 1. The live air presses on the said wing and holds the valve positively in position until the piston has rebounded and come forward sufficiently to expose the port 12. The piston strikes an uncushioned blow so that the full force of the piston is delivered to the tool. My valve is positively held by the live air after it is thrown so that it cannot be jolted out of position, and thus great certainty of action results. The combining of the live air and exhaust ports results in simplicity and permits the valve chest to be lighter in weight because less metal is required to accommodate the ports.

The principle of the commercial embodiment of my invention shown in Figs. 3 to 6, inclusive, is the same as that shown in Figs. 1 and 2. Referring to said commercial embodiment (Figs. 3 to 6) the valve 16 is of the same shape as before described. It rests upon a valve seat 17 placed in the bottom of a valve box 18, which, in the present instance, is cast upon the valve casing. The valve and valve seat are held in place by a cover 19. The valve seat has four ports formed in it, namely, two live air ports 20 and 21, respectively, and two exhaust ports, 22 and 23, respectively, the live air ports corresponding to the ports 8 and 7, respectively, of Figs. 1 and 2, and the exhaust ports corresponding to the ports 9 and 10 of the said figures respectively. Dowel pins 23$^a$ hold the valve seat in proper position. By making the valve seat a separate piece of metal the ports can be formed in it much more cheaply and accurately than if they were formed in the main cylinder casting. I preferably form in the main cylinder casting a port 24 connecting the forward end of the cylinder with the port 21 in the valve seat, and corresponding to the passage 7 in Figs. 1 and 2. I also form a port 25 from the rear end of the cylinder connecting with the port 20 in the valve seat, and corresponding to the port or passage 8 in Figs. 1 and 2. A branch port 26 connects the port 24 with the port 23 in the valve seat and corresponds to the branch or exhaust port 9 of the cylinder. A branch port 27 connects the port 25 with the exhaust port 22 in the valve seat and corresponds to the branch or exhaust port 10 in Figs. 1 and 2. A port 28 opens from the valve box directly into the cylinder below and corresponds to the port 12 of Figs. 1 and 2. A port 29 opens from the forward portion of the cylinder into the valve box and corresponds to the port 14 of Figs. 1 and 2. The live air enters by the connection 30 and is exhausted through the connection 31.

As the operation of the form shown in Figs. 3 to 6 is the same as that shown in Figs. 1 and 2, it is unnecessary to describe it.

I claim:

1. In a valve motion, the combination of a cylinder and piston, supply and exhaust ports, a valve having opposite wings adapted to control said ports by a movement toward and away from the same in a direction longitudinal of the ports, other opposite wing surfaces adapted to be used in shifting said valves, and ports adapted to admit air to said surfaces.

2. In a valve motion, the combination of a cylinder and piston, supply and exhaust ports, a pivoted valve having opposite wings adapted to control said ports by a movement toward and away from the same in a direction longitudinal of the ports, separate wings for shifting the valve, and ports for admitting air to said latter wings.

3. In a valve motion, the combination of a cylinder and piston, supply and exhaust ports, a rotatable valve having wings adapted to control said ports by a movement toward and away from the same in a direction longitudinal of the ports, the ports for each end of the cylinder entering the latter at the same point relative to its length, and means for shifting said valve.

4. In a valve motion, the combination of a cylinder and piston, supply and exhaust ports, a rotatable valve having wings adapted to control said ports by a movement toward and away from the same in a direction longitudinal of the ports, the ports for each end of the cylinder entering the latter at the same point relative to its length, and means for shifting said valve, said means comprising valve shifting wings, and ports adapted to admit air to said wings.

5. In a valve motion, the combination of a cylinder and piston, a rotatable valve having supply and exhaust controlling wings on opposite sides of its center, and a port from each end of the cylinder to opposite sides of said valve, said ports branching to said supply and exhaust controlling wings.

6. In a valve motion, the combination of a cylinder and piston, a rotatable valve having supply and exhaust controlling wings on opposite sides of its center, a port from each end of the cylinder to opposite sides of ply and exhaust controlling wings, opposite valve shifting wings, and ports for admitting air to said latter wings.

7. In a valve motion, the combination of a cylinder and piston, supply and exhaust ports, a rotatable valve having wings adapted to control said ports by a movement toward and away from the same in a direction longitudinal of the ports, said valve having opposite wings, other than the parts for controlling said ports, for shifting the valve, said wings being seated in slots against which the edges of said wings fit, and ports opening into said slots from points in said cylinder for admitting air to act on said wings.

8. In a valve motion, the combination of a cylinder and piston, supply and exhaust ports, a rotatable valve having wings adapted to control said ports by a movement toward and away from the same in a direction longitudinal of the ports, said valve having opposite wings, other than the parts for controlling said ports, for shifting the valve, said wings being seated in slots against which the edges of said wings fit, and ports opening into said slots from points in said cylinder for admitting air to act on said wings, said last mentioned ports being adapted to be uncovered by the piston as the latter passes toward the opposite end of the cylinder.

9. In a pneumatic tool, the combination of a cylinder a rotative valve, a cylindrical box containing said valve, a valve box casing on said cylinder having ports opening through the bottom thereof, and a separate valve seat located over said ports and having said valve resting thereon.

10. In a pneumatic tool, the combination of a cylinder and piston, a cylindrical valve casing formed on the cylinder and perpendicular thereto, ports from said cylinder entering the bottom of said valve box, a valve seat seated in said cylinder and having ports therethrough, a rotative valve mounted in said valve box casing on said valve seat and a cover completely closing the top of said casing.

11. In a percussive engine the combination of a cylinder, its piston, a valve chest and a valve therein, comprising a central body portion and a plurality of radiating wings, one wing controlling the inlet ports leading to the ends of the cylinder, another wing controlling the exhaust from the ends of the cylinder, another wing controlling the movement of the valve but being free from control of the admission or exhaust ports of the cylinder, the engine having ports connecting the cylinder with faces of the controlling wing or wings.

In testimony that I claim the foregoing I have hereunto set my hand.

ROBERT LUNNAN AMBROSE.

Witnesses:
ROYAL J. DAY,
JOHN F. MOCK.